United States Patent
Miracle et al.

(10) Patent No.: US 10,696,928 B2
(45) Date of Patent: Jun. 30, 2020

(54) DETERGENT COMPOSITIONS CONTAINED IN A WATER-SOLUBLE FILM CONTAINING A LEUCO COLORANT

(71) Applicant: The Procter & Gamble Company, Cincinnati, OH (US)

(72) Inventors: Gregory Scot Miracle, Liberty Township, OH (US); Daniel Dale Ditullio, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 5 days.

(21) Appl. No.: 16/352,913

(22) Filed: Mar. 14, 2019

(65) Prior Publication Data
US 2019/0292496 A1 Sep. 26, 2019

Related U.S. Application Data

(60) Provisional application No. 62/645,821, filed on Mar. 21, 2018.

(51) Int. Cl.
| | |
|---|---|
| *C11D 3/40* | (2006.01) |
| *C11D 3/42* | (2006.01) |
| *C11D 17/04* | (2006.01) |
| *C09B 11/12* | (2006.01) |
| *C11D 3/00* | (2006.01) |

(52) U.S. Cl.
CPC .............. *C11D 3/42* (2013.01); *C11D 3/40* (2013.01); *C11D 17/042* (2013.01); *C11D 17/043* (2013.01); *C11D 17/045* (2013.01); *C09B 11/12* (2013.01); *C11D 3/0084* (2013.01)

(58) Field of Classification Search
CPC ........... C11D 3/3753; C11D 3/40; C11D 3/42; C11D 9/444; C11D 11/0017; C11D 17/0042
See application file for complete search history.

(56) References Cited

U.S. PATENT DOCUMENTS

| | | | |
|---|---|---|---|
| 2010/0069283 A1* | 3/2010 | Prabhat | C11D 3/42 510/307 |
| 2015/0111807 A1* | 4/2015 | Miracle | C11D 3/3723 510/325 |
| 2016/0168517 A1* | 6/2016 | Massey-Brooker | C11D 1/29 510/296 |
| 2017/0175051 A1* | 6/2017 | Fernandes | C09B 67/0007 |
| 2018/0119056 A1* | 5/2018 | Qin | C09B 11/12 |
| 2018/0127692 A1* | 5/2018 | Coope-Epstein | C11D 17/043 |
| 2018/0245025 A1* | 8/2018 | Qin | C09B 11/10 |

OTHER PUBLICATIONS

U.S. Appl. No. 16/352,917, filed Mar. 14, 2019, Miracle, et al.

* cited by examiner

*Primary Examiner* — Charles I Boyer
(74) *Attorney, Agent, or Firm* — John T. Dipre

(57) ABSTRACT

Detergent compositions comprising a water-soluble film and a leuco colorant. At least about 10% of the leuco colorant is incorporated into the water-soluble film. Methods of making such detergent compositions.

A detergent composition including (a) at least one laundry care ingredient and (b) a leuco composition. The leuco composition has a first color state and a second color state and the mole ratio of second color state to first color state is from 2:98 to 5:95. Also disclosed are methods of determining the approximate functional age of a detergent composition comprising the steps of (a) providing a detergent composition that includes at least one laundry care ingredient and a leuco composition, (b) providing a functional age scale that includes a plurality of distinct colors that correspond to a unique functional age and (c) comparing the color of the detergent composition with the functional age scale.

20 Claims, 1 Drawing Sheet ns to methods
DETERGENT COMPOSITIONS CONTAINED IN A WATER-SOLUBLE FILM CONTAINING A LEUCO COLORANT

FIELD OF THE INVENTION

The present disclosure relates in part to a detergent composition comprising a water-soluble or water-dispersible film and a leuco colorant. These types of colorants are provided in a stable, substantially colorless state and then may be transformed to an intense colored state upon exposure to certain physical or chemical changes such as, for example, exposure to oxygen, ion addition, exposure to light, and the like. This application further relates to methods for determining the approximate functional age of a detergent composition comprising a leuco composition. The invention also relates to a process for making such a detergent composition.

BACKGROUND OF THE INVENTION

Detergents today are available in a wide variety of forms such as powders, granules, liquids and gels. Unit dose and concentrated (or compact) detergent forms are becoming increasingly popular due to the convenience they offer the consumer on lower weight and, in the case of unit dose, simplified dosing. The highly concentrated nature of these forms offers further sustainability advantages, such as reduced shipping costs and environmental impact (e.g. carbon footprint).

As detergent compositions age, it is known that they may become more yellow due to any of a number of causes, including, for example, exposure to light, heat, air permeating through the package, natural degradation of the compositions components, or reactions involving formulated components. Further, as many laundry compositions age, their efficacy tends to decline as certain components may degrade with age and lose potency. Consumers accustomed to expiration dates on items understand that formulations have some limited time in which they will function as expected, after which they expect some decrease in the efficacy of the product. However, few if any products provide the consumer a means by which they can assess where a product in their possession is in relation to its expected useful lifespan, even when a date of production is on the package. This date of manufacture cannot provide any information regarding the impact of the conditions to which the product has been exposed between the date of manufacture and the point of purchase. The date of manufacture indicates only the maximum possible freshness and/or functioning of the product at any point in time, but adverse storage conditions lead to deterioration that decreases efficacy of certain ingredients (such as enzymes) and there is no means by which a consumer may estimate the functional age of the formulation.

It is also known that as textile substrates age, their color tends to fade or yellow due to exposure to light, air, soil, and natural degradation of the fibers that comprise the substrates. As such, to visually enhance these textile substrates and counteract the fading and yellowing the use of polymeric colorants for coloring consumer products has become well known in the prior art. For example, it is well known to use whitening agents, either optical brighteners or bluing agents, in textile applications. However, due to the blue or violet hue of traditional bluing agents, formulators have been constrained to using traditional bluing agents in dark blue detergent compositions that show little if any color change over time.

Leuco dyes are also known in the prior art to exhibit a change from a colorless or slightly colored state to a colored state upon exposure to specific chemical or physical triggers. The change in coloration that occurs is typically visually perceptible to the human eye. Most organic compounds have some absorbance in the visible light region (400-750 nm), and thus more or less have some color. As referred to herein, a dye is considered as a "leuco dye" if it did not render a significant color at its application concentration and conditions, but renders a significant color in its triggered form. The color change upon triggering stems from the change of the molar attenuation coefficient (also known as molar extinction coefficient, molar absorption coefficient, and/or molar absorptivity in some literatures) of the leuco dye molecule in the 400-750 nm range, preferably in the 500-650 nm range, and most preferably in the 530-620 nm range. The increase of the molar attenuation coefficient of a leuco dye before and after the triggering should be bigger than 50%, more preferably bigger than 200%, and most preferably bigger than 500%.

As such, there remains a need for a consumer to assess the estimated functional age of a unit dose composition and, thereby, the composition's estimated efficacy.

It has now surprisingly been found that the presently claimed leuco colorants incorporated into the film of a unit dose composition develop their color over time in response to environmental factors such as the temperatures to which they have been exposed, thereby providing the consumer with an estimated functional age of the compositions. Additionally, where the leuco colorants develop blue color, they can be used to counteract the natural yellowing of aged detergent compositions, and will typically be designed to deposit on fabric through the wash, either in their leuco form, or in their oxidized form to provide a whiteness enhancement to aged fabrics.

SUMMARY OF THE INVENTION

The present disclosure relates to a detergent composition comprising a first composition, a water-soluble film, and a leuco colorant. The first composition is selected from the group consisting of a liquid detergent, a granular detergent, or a tablet detergent, and at least about 10% of the leuco colorant is incorporated into the water-soluble film.

In another aspect, the present invention relates to a method of determining the approximate functional age of a detergent composition comprising the steps of (a) providing a detergent composition comprising (i) a water-soluble film, (ii) at least one laundry care ingredient, and (iii) a leuco composition; (b) providing a functional age scale comprising a plurality of distinct colors wherein each distinct color corresponds to a unique functional age; and (c) comparing the color of the detergent composition with the functional age scale.

The present disclosure also relates to a method of making a detergent composition comprising a first composition, a water-soluble film and a leuco colorant. The method comprises the steps of incorporating the leuco colorant into the film, optionally incorporating an antioxidant into the film, and encapsulating the first composition in the water-soluble film.

The present disclosure also relates to a detergent composition comprising (a) a water-soluble film, (b) at least one laundry care ingredient and (c) a leuco colorant. The leuco colorant has a first color state and a second color state and the mole ratio of second color state to first color state is from 2:98 to 25:75, preferably 2:98 to 15:85, or to 10:90, or even to 5:95.

The present disclosure also relates to a unit dose detergent composition comprising at least one compartment, a water-soluble film, and a leuco colorant. At least about 10% of the leuco colorant is incorporated into the water-soluble film.

DETAILED DESCRIPTION OF THE INVENTION

Figure 1:
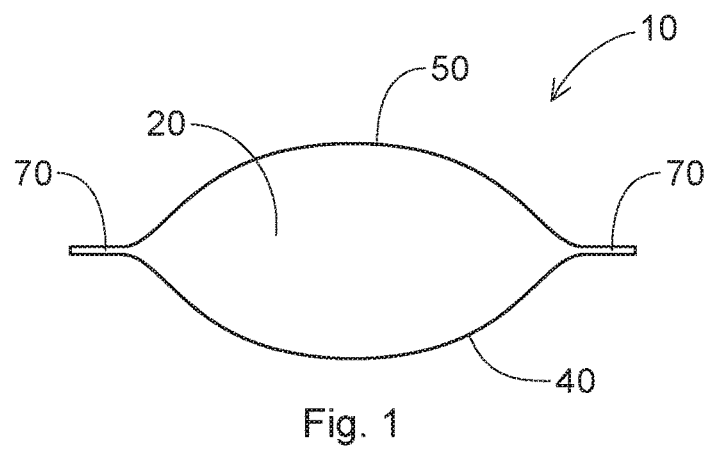
FIG. 1 is a side view of a unit dose article according to the present invention.
Figure 2:
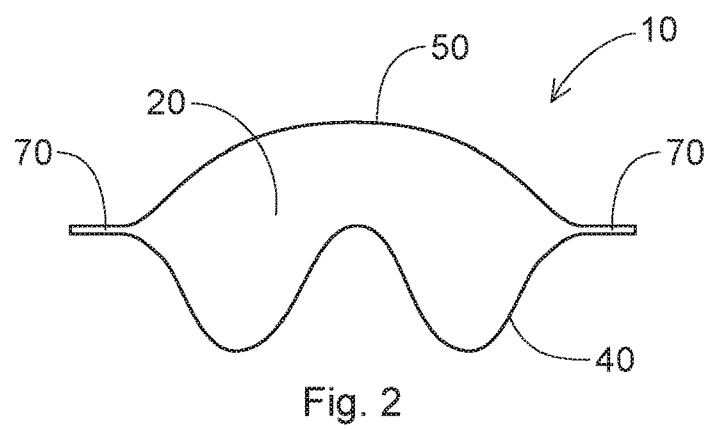
FIG. 2 is a side view of another embodiment of unit dose article according to the present invention.

The present disclosure relates to detergent compositions that comprise a water-soluble film and a leuco colorant.

Definitions

Features and benefits of the various embodiments of the present invention will become apparent from the following description, which includes examples of specific embodiments intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the spirit and scope of the invention as defined by the claims.

As used herein, the articles including "the," "a" and "an" when used in a claim or in the specification, are understood to mean one or more of what is claimed or described.

As used herein, the terms "include," "includes" and "including" are meant to be non-limiting. The phases "comprising" or "comprises" are intended to include the more limiting phrases "consisting essentially of" and "consisting of." Therefore, a composition that comprises a component may consist essentially of that component, or consist of that component.

As used herein, the terms "substantially free of" or "substantially free from" mean that the indicated material is at the very minimum not deliberately added to the composition to form part of it, or, preferably, is not present at analytically detectable levels. It is meant to include compositions whereby the indicated material is present only as an impurity in one of the other materials deliberately included.

As used herein, the term "soiled material" is used non-specifically and may refer to any type of flexible material consisting of a network of natural or artificial fibers, including natural, artificial, and synthetic fibers, such as, but not limited to, cotton, linen, wool, polyester, nylon, silk, acrylic, and the like, as well as various blends and combinations. Soiled material may further refer to any type of hard surface, including natural, artificial, or synthetic surfaces, such as, but not limited to, tile, granite, grout, glass, composite, vinyl, hardwood, metal, cooking surfaces, plastic, and the like, as well as blends and combinations.

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, the interchangeable terms "alkyleneoxy" and "oxyalkylene," and the interchangeable terms "polyalkyleneoxy" and "polyoxyalkylene," generally refer to molecular structures containing one or more than one, respectively, of the following repeating units: —$C_2H_4O^-$, —$C_3H_6O^-$, —$C_4H_8O$—, and any combinations thereof. Non-limiting structures corresponding to these groups include —$CH_2CH_2O$—, —$CH_2CH_2CH_2O^-$, —$CH_2CH_2CH_2CH_2O$—, —$CH_2CH(CH_3)O$—, and —$CH_2CH(CH_2CH_3)O$—, for example. Furthermore, the polyoxyalkylene constituent may be selected from the group consisting of one or more monomers selected from a $C_{2-20}$ alkyleneoxy group, a glycidyl group, or mixtures thereof.

The terms "ethylene oxide," "propylene oxide" and "butylene oxide" may be shown herein by their typical designation of "EO," "PO" and "BO," respectively.

As used herein, the terms "alkyl" and "alkyl capped" are intended to mean any univalent group formed by removing a hydrogen atom from a substituted or unsubstituted hydrocarbon. Non-limiting examples include hydrocarbyl moieties which are branched or unbranched, substituted or unsubstituted including $C_1$-$C_{18}$ alkyl groups, and in one aspect, $C_1$-$C_6$ alkyl groups.

As used herein, unless otherwise specified, the term "aryl" is intended to include $C_3$-$C_{12}$ aryl groups. The term "aryl" refers to both carbocyclic and heterocyclic aryl groups.

As used herein, the term "alkaryl" refers to any alkyl-substituted aryl substituents and aryl-substituted alkyl substituents. More specifically, the term is intended to refer to $C_{7-16}$ alkyl-substituted aryl substituents and $C_{7-16}$ aryl substituted alkyl substituents which may or may not comprise additional substituents.

As used herein, the term "laundry care composition" includes, unless otherwise indicated, granular, powder, liquid, gel, paste, unit dose, bar form and/or flake type washing agents and/or fabric treatment compositions, including but not limited to products for laundering fabrics, fabric softening compositions, fabric enhancing compositions, fabric freshening compositions, and other products for the care and maintenance of fabrics, and combinations thereof. Such compositions may be pre-treatment compositions for use prior to a washing step or may be rinse added compositions, as well as cleaning auxiliaries, such as bleach additives and/or "stain-stick" or pre-treat compositions or substrate-laden products such as dryer added sheets.

As used herein, the term "leuco" (as used in reference to, for example, a compound, moiety, radical, dye, monomer, fragment, or polymer) refers to an entity (e.g., organic compound or portion thereof) that, upon exposure to specific chemical or physical triggers, undergoes one or more chemical and/or physical changes that results in a shift from a first color state (e.g., uncolored or substantially colorless) to a second more highly colored state. Suitable chemical or physical triggers include, but are not limited to, oxidation, pH change, temperature change, and changes in electromagnetic radiation (e.g., light) exposure. Suitable chemical or physical changes that occur in the leuco entity include, but are not limited to, oxidation and non-oxidative changes, such as intramolecular cyclization. Thus, in one aspect, a suitable leuco entity can be a reversibly reduced form of a chromophore. In one aspect, the leuco moiety preferably comprises at least a first and a second π-system capable of being converted into a third combined conjugated π-system incorporating said first and second π-systems upon exposure to one or more of the chemical and/or physical triggers described above.

As used herein, the terms "leuco composition" or "leuco colorant composition" refers to a composition comprising at least two leuco compounds having independently selected structures as described in further detail herein.

As used herein "average molecular weight" of the leuco colorant is reported as a weight average molecular weight, as determined by its molecular weight distribution: as a consequence of their manufacturing process, the leuco colorants disclosed herein may contain a distribution of repeating units in their polymeric moiety.

As used herein, the terms "maximum extinction coefficient" and "maximum molar extinction coefficient" are intended to describe the molar extinction coefficient at the wavelength of maximum absorption (also referred to herein as the maximum wavelength), in the range of 400 nanometers to 750 nanometers.

As used herein, the term "converting agent" refers to any oxidizing agent as known in the art other than molecular oxygen in any of its known forms (singlet and triplet states).

As used herein, the term "triggering agent" refers to a reactant suitable for converting the leuco composition from a colorless or substantially colorless state to a colored state.

As used herein, the term "whitening agent" refers to a dye or a leuco colorant that may form a dye once triggered that when on white cotton provides a hue to the cloth with a relative hue angle of 210 to 345, or even a relative hue angle of 240 to 320, or even a relative hue angle of 250 to 300 (e.g., 250 to 290).

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, articles such as "a" and "an" when used in a claim, are understood to mean one or more of what is claimed or described.

As used herein, the terms "include/s" and "including" are meant to be non-limiting.

As used herein, the term "solid" includes granular, powder, bar and tablet product forms.

As used herein, the term "fluid" includes liquid, gel, paste and gas product forms.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

In one aspect, the molar extinction coefficient of said second colored state at the maximum absorbance in the wavelength in the range 200 to 1,000 nm (more preferably 400 to 750 nm) is preferably at least five times, more preferably 10 times, even more preferably 25 times, most preferably at least 50 times the molar extinction coefficient of said first color state at the wavelength of the maximum absorbance of the second colored state. Preferably, the molar extinction coefficient of said second colored state at the maximum absorbance in the wavelength in the range 200 to 1,000 nm (more preferably 400 to 750 nm) is at least five times, preferably 10 times, even more preferably 25 times, most preferably at least 50 times the maximum molar extinction coefficient of said first color state in the corresponding wavelength range. An ordinarily skilled artisan will realize that these ratios may be much higher. For example, the first color state may have a maximum molar extinction coefficient in the wavelength range from 400 to 750 nm of as little as 10 $M^{-1}$ $cm^{-1}$, and the second colored state may have a maximum molar extinction coefficient in the wavelength range from 400 to 750 nm of as much as 80,000 $M^{-1}$ $cm^{-1}$ or more, in which case the ratio of the extinction coefficients would be 8,000:1 or more.

In one aspect, the maximum molar extinction coefficient of said first color state at a wavelength in the range 400 to 750 nm is less than 1000 $M^{-1}$ $cm^{-1}$, and the maximum molar extinction coefficient of said second colored state at a wavelength in the range 400 to 750 nm is more than 5,000 $M^{-1}$ $cm^{-1}$, preferably more than 10,000, 25,000, 50,000 or even 100,000 $M^{-1}$ $cm^{-1}$. A skilled artisan will recognize and appreciate that a polymer comprising more than one leuco moiety may have a significantly higher maximum molar extinction coefficient in the first color state (e.g., due to the additive effect of a multiplicity of leuco moieties or the presence of one or more leuco moieties converted to the second colored state).

Detergent Composition

As used herein, the phrase "detergent composition" includes compositions and formulations designed for cleaning soiled material. Such compositions include, but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. The detergent compositions may have a form selected from liquid, powder, slurry, single-phase or multi-phase unit dose articles, pouch, tablet, gel, paste, bar, or flake.

In some aspects, the detergent composition comprises a first composition where the first composition is selected from the group consisting of a liquid detergent, a granular detergent, or a tablet detergent. Preferably, when the first composition is a granular detergent or a tablet detergent, the first composition is encased in either a water-soluble film or a water-soluble coating.

Liquid detergent compositions and other forms of detergent compositions that include a liquid component (such as liquid-containing unit dose detergent compositions) may contain water and other solvents as fillers or carriers. Low molecular weight primary or secondary alcohols exemplified by methanol, ethanol, propanol, and isopropanol are suitable. Monohydric alcohols may be used in some examples for solubilizing surfactants, and polyols such as those containing from 2 to about 6 carbon atoms and from 2 to about 6 hydroxy groups (e.g., 1,3-propanediol, ethylene glycol, glycerine, and 1,2-propanediol) may also be used. Amine-containing solvents may also be used. Solvents particularly useful in unit dose articles are described below.

The detergent compositions may contain from about 5% to about 90%, and in some examples, from about 10% to about 50%, by weight of the composition, of such carriers. For compact or super-compact heavy duty liquid or other forms of detergent compositions, the use of water may be lower than about 40% by weight of the composition, or lower than about 20%, or lower than about 5%, or less than about 4% free water, or less than about 3% free water, or less than about 2% free water, or substantially free of free water (i.e., anhydrous).

The liquid detergent compositions may comprise water. However, when the liquid composition will be in contact with water-soluble film, for example in a unit dose article, it is typically desirable to limit the amount of water so as to preserve the film's integrity and to prevent a tacky feel to the pouches. Therefore, in some embodiments, the liquid detergent composition comprises less than about 50% water by weight of the liquid composition, or less than about 40% water by weight of the liquid composition, or from about 1% to about 30%, or preferably from about 2% to about 20%, or from about 5% to about 13%, water by weight of the liquid composition.

For powder or bar detergent compositions, or forms that include a solid or powder component (such as powder-containing unit dose detergent composition), suitable fillers may include, but are not limited to, sodium sulfate, sodium chloride, clay, or other inert solid ingredients. Fillers may also include biomass or decolorized biomass. Fillers in granular, bar, or other solid detergent compositions may comprise less than about 80% by weight of the detergent composition, and in some examples, less than about 50% by weight of the detergent composition. Compact or supercompact powder or solid detergent compositions may comprise less than about 40% filler by weight of the detergent composition, or less than about 20%, or less than about 10%.

For either compacted or supercompacted liquid or powder detergent compositions, or other forms, the level of liquid or solid filler in the product may be reduced, such that either the same amount of active chemistry is delivered to the wash liquor as compared to noncompacted detergent compositions, or in some examples, the detergent composition is more efficient such that less active chemistry is delivered to the wash liquor as compared to noncompacted compositions. For example, the wash liquor may be formed by contacting the detergent composition to water in such an amount so that the concentration of detergent composition in the wash liquor is from above 0 g/l to 4 g/l. In some examples, the concentration may be from about 1 g/l to about 3.5 g/l, or to about 3.0 g/l, or to about 2.5 g/l, or to about 2.0 g/l, or to about 1.5 g/l, or from about 0 g/l to about 1.0 g/l, or from about 0 g/l to about 0.5 g/l. These dosages are not intended to be limiting, and other dosages may be used that will be apparent to those of ordinary skill in the art.

In some aspects, referring to the embodiments in FIGS. 1-4, the detergent composition is in the form of a unit dose article 10. The unit dose article 10 comprises at least one compartment, wherein the compartment comprises a composition, for example a first composition 20. A unit dose article 10 is intended to provide a single, easy to use dose of the composition contained within the article for a particular application. In some aspects, the detergent composition is in unit dose form 10 and comprises water-soluble film that encapsulates a liquid detergent.

The compartment should be understood as meaning a closed internal space within the unit dose article, which holds the composition. Preferably, the unit dose article comprises a water-soluble film. The unit dose article is manufactured such that the water-soluble film completely surrounds the composition and in doing so defines the compartment in which the composition resides. The unit dose article may comprise two films. A first film 40 may be shaped to comprise an open compartment into which the composition is added. A second film 50 is then laid over the first film 40 in such an orientation as to close the opening of the compartment. The first 40 and second 50 films are then sealed together along a seal region 70. The seal region 70 may comprise a flange. The flange is comprised of excess sealed film material that protrudes beyond the edge of the unit dose article and provides increased surface area for seal of the first 40 and second 50 films. The film is described in more detail below. In some aspects, the unit dose article 10 comprises three, four, five or more films.

Figure 3:
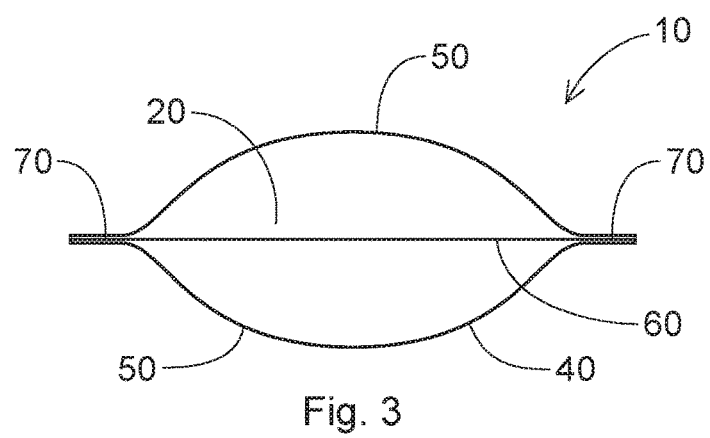
FIG. 3 is a side view of another embodiment of unit dose article according to the present invention.
Figure 4:
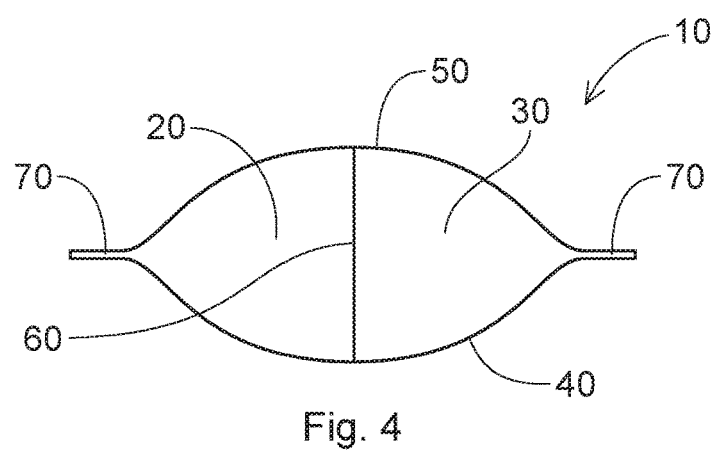
FIG. 4 is a side view of another embodiment of unit dose article according to the present invention.

The unit dose article 10 may comprise more than one compartment, even at least two compartments, or even at least three compartments. In some aspects, the unit dose article 10 comprises 1, or 2, or 3, or 4, or 5 compartments. The compartments may be arranged in superposed orientation, i.e., one positioned on top of the other, as shown in FIG. 3, where they may share a common wall 60. In one aspect, at least one compartment is superposed on another compartment. Alternatively, the compartments may be positioned in a side-by-side orientation, i.e., one orientated next to the other, as shown in FIG. 4. The compartments may even be orientated in a 'tire and rim' arrangement, i.e., a first compartment is positioned next to a second compartment, but the first compartment at least partially surrounds the second compartment, but does not completely enclose the second compartment. Alternatively, one compartment may be completely enclosed within another compartment.

When the unit dose article comprises at least two compartments, one of the compartments may be smaller than the other compartment. When the unit dose article comprises at least three compartments, two of the compartments may be smaller than the third compartment, and preferably the smaller compartments are superposed on the larger compartment. The smaller superposed compartments preferably are orientated side-by-side.

When the unit dose article comprises at least two compartments, each compartment may comprise identical compositions, or each compartment may independently comprise a different composition. The compartments may be sensorially different; for example, the compartments may have different shapes, or they may be different colors.

The encapsulated compositions may be any suitable composition. The composition may be in the form of a solid, a liquid, a dispersion, a gel, a paste, or a mixture thereof. The compositions in each compartment of a multicompartment unit dose article may be different.

However, typically at least one compartment of the unit dose article, preferably each compartment, comprises a liquid. The composition is described in more detail below.

Water-Soluble or Water-Dispersible Film

In some aspects, the detergent composition of the present disclosure comprises water-soluble or water-dispersible film. The film may encapsulate the detergent composition, preferably the first composition. The film may encapsulate a liquid composition, a granular detergent, a tablet detergent, or mixtures thereof. The terms water-soluble and water-dispersible are used interchangeably in the present application.

The film of the present invention is soluble or dispersible in water. The water-soluble film preferably has a thickness of from about 20 to about 150 microns, preferably about 35 to about 125 microns, even more preferably about 50 to about 110 microns, most preferably about 76 microns. Preferably, the film has a water-solubility of at least 50%, preferably at least 75% or even at least 95%, as measured by the method set out here after using a glass-filter with a maximum pore size of 20 microns:

50 grams ±0.1 gram of film material is added in a pre-weighed 400 ml beaker and 245 ml±1 ml of distilled water is added. This is stirred vigorously on a magnetic stirrer, Lab-Line model No. 1250 or equivalent and 5 cm magnetic stirrer, set at 600 rpm, for 30 minutes at 24° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-molding, extrusion, or blown extrusion of the polymeric material, as known in the art. Preferably the film is obtained by an extrusion process or by a casting process.

Preferred polymers (including copolymers, terpolymers, or derivatives thereof) suitable for use as film material are selected from polyvinyl alcohols (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More-preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the polymers of the film material are free of carboxylate groups.

Preferably, the level of polymer in the film material, for example a PVA polymer, is at least 60%. The polymer can have any weight average molecular weight, preferably from about 1000 to 1,000,000, more preferably from about 10,000 to 300,000, yet more preferably from about 20,000 to 150,000.

Mixtures of polymers can also be used as the film material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000 to about 40,000, preferably about 20,000, and of PVA or copolymer thereof, with a weight average molecular weight of about 100,000 to about 300,000, preferably about 150,000. Also, suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers, preferably polyvinyl alcohol, have a degree of hydrolysis of from about 60% to about 99%, preferably from about 80% to about 99%, even more preferably from about 80% to about 90%, to improve the dissolution characteristics of the material. As used herein, the degree of hydrolysis is expressed as a percentage of vinyl acetate units converted to vinyl alcohol units.

Preferred films exhibit good dissolution in cold water, meaning unheated distilled water. Preferably such films exhibit good dissolution at temperatures 24° C., even more preferably at 10° C. By good dissolution it is meant that the film exhibits water-solubility of at least 50%, preferably at least 75% or even at least 95%, as measured, by the method set out herein using a glass-filter with a maximum pore size of 20 microns, described above. Water-solubility may be determined at 24° C., or preferably at 10° C.

Preferred films are those supplied by Monosol (Merrillville, Ind., USA) under the trade references M8630, M8900, M8779, and M8310 films described in U.S. Pat. Nos. 6,166,117 and 6,787,512, and PVA films of corresponding solubility and deformability characteristics. Other suitable films may include called Solublon® PT, Solublon® GA, Solublon® KC or Solublon® KL from the Aicello Chemical Europe GmbH, the films VF-HP by Kuraray, or the films by Nippon Gohsei, such as Hi Selon. Further preferred films are those described in US2006/0213801, US2011/0188784, WO2010/119022, and U.S. Pat. No. 6,787,512. In some aspects, it is preferable to use a film that exhibits better dissolution than M8630 film, supplied by Monosol, at temperatures 24° C., even more preferably at 10° C.

Preferred water-soluble films are those derived from a resin that comprises a blend of polymers, preferably wherein at least one polymer in the blend is polyvinyl alcohol. Preferably, the water-soluble film resin comprises a blend of PVA polymers. For example, the PVA resin can include at least two PVA polymers, wherein as used herein the first PVA polymer has a viscosity less than the second PVA polymer. A first PVA polymer can have a viscosity of at least 8 centipoise (cP), 10 cP, 12 cP, or 13 cP and at most 40 cP, 20 cP, 15 cP, or 13 cP, for example in a range of about 8 cP to about 40 cP, or 10 cP to about 20 cP, or about 10 cP to about 15 cP, or about 12 cP to about 14 cP, or 13 cP. Furthermore, a second PVA polymer can have a viscosity of at least about 10 cP, 20 cP, or 22 cP and at most about 40 cP, 30 cP, 25 cP, or 24 cP, for example in a range of about 10 cP to about 40 cP, or 20 to about 30 cP, or about 20 to about 25 cP, or about 22 to about 24, or about 23 cP. The viscosity of a PVA polymer is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C. All viscosities specified herein in cP should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

The individual PVA polymers can have any suitable degree of hydrolysis, as long as the degree of hydrolysis of the PVA resin is within the ranges described herein. Optionally, the PVA resin can, in addition or in the alternative, include a first PVA polymer that has a molecular weight in a range of about 50,000 to about 300,000 Daltons, or about 60,000 to about 150,000 Daltons; and a second PVA polymer that has a molecular weight in a range of about 60,000 to about 300,000 Daltons, or about 80,000 to about 250,000 Daltons.

Different film material and/or films of different thickness may be employed in making the compartments of the present invention. A benefit in selecting different films is that the resulting compartments may exhibit different solubility or release characteristics.

In some aspects, hydrophobically modified polymers are employed. Polymers suitable for use as whole or part of the backbone of thehydrophobically modified polymer are preferably selected from the group consisting of polyvinyl alcohol, polyvinyl acetate, cellulose ethers, polyethylene oxide, starch, polyvinylpyrrolidone, polyacrylamide, polyvinyl methyl ether-maleic anhydride, polymaleic anhydride, styrene maleic anhydride, hydroxyethylcellulose, methylcellulose, polyethylene glycols, carboxymethylcellulose, polyacrylic acid salts, alginates, acrylamide copolymers, guar gum, casein, ethylene-maleic anhydride resin series, polyethylenimine, ethyl hydroxyethylcellulose, ethyl methylcellulose, and hydroxyethyl methylcellulose. Copolymer mixtures of polymers derived from the aforementioned backbones are also suitable. Preferably the polymer has a backbone comprising side chain hydroxyl groups, more preferably side chain hydroxyl groups that are located on carbon atoms spaced 1,2 or 1,3 from one another.

In one aspect, a preferred backbone for hydrophobic modification comprises polyvinyl alcohol, and the polymer preferably has an average molecular weight of from 1,000 to 300,000 Daltons, preferably 2,000 to 100,000 Daltons. Such polyvinyl alcohol generally comprises at least some polyvinyl acetate (PVAc). The PVOH materials either before or after hydrophobic modification may comprise from 0.01 to 40%, preferably from 0.01 to 29%, more preferably 0.1 to 15%, most preferably 0.5 to 10%, based on the percent of the total number of monomers making up the polymer. As used herein, the term polyvinyl alcohol (PvOH) includes PVOH compounds with PVAc levels as defined hereinabove.

The polymer is modified to comprise hydrophobic substituents. Preferred derivatization groups include this based on parent groups selected from acetals, ketals, esters, fluorinated organic compounds, ethers, alkanes, alkenes, and aromatics. Highly preferred hydrophobic substituents are hydrocarbyl groups of $C_4$ to $C_{22}$ carbon chain length, wherein the hydrocarbyl groups may be alkyl or alkenyl, and may be straight chain or branched, may comprise rings, may optionally incorporate aromatic moieties, and combinations thereof. Additional modifying groups, such as amines, may be present on the polymer backbone.

More preferably the hydrocarbyl group has a chain length from $C_4$ to $C_{20}$, even more preferably from $C_4$ to $C_{15}$, most preferably from $C_4$ to $C_{10}$, for example, from $C_4$ to $C_8$. Preferred materials suitable for use to introduce the hydrophobic derivatization groups onto the polymer are aldehydes such as butyraldehyde, octyl aldehyde, dodecyl aldehyde, 2-ethylhexanal, cyclohexane carboxaldehyde, citral, and 4-aminobutyraldehyde dimethyl acetal. In one aspect, butyraldehyde is most preferred. Methods of making such hydrophobically modified polymers are disclosed in the public domain and are readily available to those skilled in the art.

The hydrophobic material is preferably present in the hydrophobically modified polymer at a level of 01 to 40% by weight, based on the total weight of the polymer, more preferably from 2 to 30%, most preferably from 5 to 15%.

In one aspect, the films may be in the form of polymer particles preferably having a size of greater than or equal to 50 □m. Preferably the particle size is from 50 □m to 2 cm, preferably from 50 □m to 1 cm. Alternatively the polymer particle may have a size from 0.1 mm to 50 mm; or from 0.5 mm to 10 mm or from 1 to 10 mm, for example. The size of the particle means the maximum value of the largest dimension of the particle.

When hydrophobically modified polymer particles are employed, the size may be either at the low end of the range hereinbefore defined, such that the particles are less visible, or they may be of a size near the high end of the range hereinbefore defined if the particles are intended to be seen.

With respect to hydrophobically modified polyvinyl alcohol films, the term "insoluble" as used herein means the polymer should not dissolve in solutions having greater than 5,000 ppm surfactant. Specifically, when 1 g/L of the modified polymer is placed into an aqueous surfactant solution comprising a 50:50 weight % mixture of a linear alkylbenzene sulfonate (LAS) and nonionic surfactant (the reaction product of aliphatic $C_{12}$-$C_{15}$ linear alcohols with 7 mole equivalents of ethylene oxide (7EO)) at a total surfactant concentration of greater than 5 g/L and shaken at 100 RPM on a rotator shaker at 293K for 2 hours, then removed from solution by filtering through a sieve or filter paper of appropriate size and dried, then the weight of modified polymer removed is within 95% of the weight that was originally added. Preferably the modified polymer is insoluble in said aqueous surfactant mixture where the surfactant concentration is from 5 to 800 g/L, more preferably from 5 to 500 g/L, for example from 50 to 500 g/L.

The film material herein, whether hydrophobically modified or not, can also comprise one or more additive ingredients. For example, the film preferably comprises a plasticizing agent. The plasticizing agent may comprise water, glycerol, ethylene glycol, diethylene glycol, propylene glycol, sorbitol, or mixtures thereof. In some aspects, the film comprises from about 2% to about 35%, or from about 5% to about 25%, by weight of the film, a plasticizing agent selected from group comprising water, glycerol, diethylene glycol, sorbitol, and mixtures thereof. In some aspects, the film material comprises at least two, or preferably at least three, plasticizing agents. In some aspects, the film is substantially free of ethanol, meaning that the film comprises from 0% (including 0%) to about 0.1% ethanol by weight of the film. In some aspects, the plasticizing agents are the same as the plasticizing solvents in the liquid composition, described below.

Other additives may include water and functional detergent additives, including surfactant, to be delivered to the wash water, for example, organic polymeric dispersants, etc.

Leuco Colorant

The detergent composition comprises a leuco colorant. Preferably, at least about 10%, 30%, 50%, 70%, 90%, or even about 95% of the leuco colorant is incorporated into the water-soluble film. In one preferred embodiment, substantially all of the leuco colorant is incorporated into water-soluble film. It will be understood that the leuco colorant can be incorporated into any part of the film(s), as discussed above. For example, in one embodiment, the leuco colorant is incorporated into one of or both of the first film and/or the second film. In yet another embodiment, the leuco colorant is incorporated into the common wall and, in one particularly preferred embodiment substantially all of the leuco colorant is incorporated into the common wall. An antioxidant may be incorporated into any part or the entirety of the water-soluble film.

The leuco colorant typically provides a blue or violet shade to fabric. Leuco colorants can be used either alone or in combination with either additional leuco colorants or traditional shading dyes to create a specific shade of hueing and/or to shade different fabric types. This may be provided for example by mixing a red and green-blue dye to yield a blue or violet shade. Preferably the hueing dye is a blue or violet hueing dye, providing a blue or violet color to a white cloth or fabric. Such a white cloth treated with the composition will have a hue angle of 210 to 345, or even a relative hue angle of 240 to 320, or even a relative hue angle of 250 to 300 (e.g., 250 to 290).

In one aspect, the invention relates to a leuco composition selected from the group consisting of a diarylmethane leuco, a triarylmethane leuco, an oxazine leuco, a thiazine leuco, a hydroquinone leuco, an arylaminophenol leuco and mixtures thereof.

Suitable diarylmethane leuco compounds for use herein include, but are not limited to, diarylmethylene derivatives capable of forming a second colored state as described herein. Suitable examples include, but are not limited to, Michler's methane, a diarylmethylene substituted with an —OH group (e.g., Michler's hydrol) and ethers and esters thereof, a diarylmethylene substituted with a photocleavable moiety, such as a —CN group (bis(para-N,N-dimethyl)phenyl)acetonitrile), and similar such compounds.

In one aspect, the invention relates to a composition comprising one or more leuco compounds conforming to the group selected from:

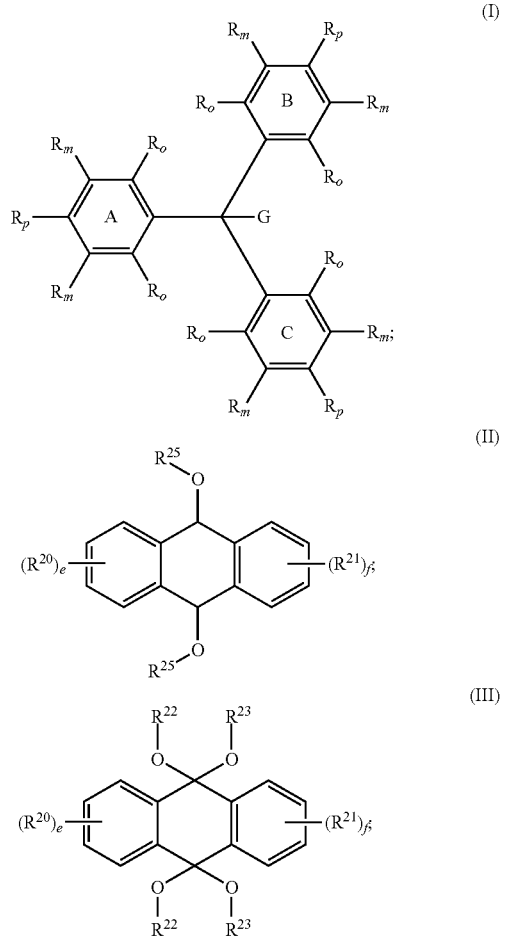

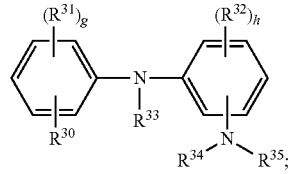

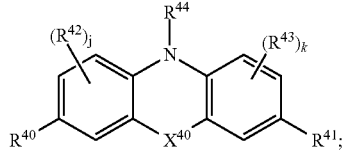

and V (f) mixtures thereof;

wherein the ratio of Formula I-V to its oxidized form is between 98:2 and 75:25, preferably between 98:2 and 85:15, or between 98:2 and 90:10, or even between 98:2 and 95:5.

In the structure of Formula (I), each individual $R_o$, $R_m$ and $R_p$ group on each of rings A, B and C is independently selected from the group consisting of hydrogen, deuterium and $R^5$; each $R^5$ is independently selected from the group consisting of halogens, nitro, alkyl, substituted alkyl, aryl, substituted aryl, alkaryl, substituted alkaryl, —$(CH_2)_n$—O—$R^1$, —$(CH_2)_n$—$NR^1R^2$, —$C(O)R^1$, —$C(O)OR^1$, —$C(O)O^-$, —$C(O)NR^1R^2$, —$OC(O)R^1$, —$OC(O)OR^1$, —$OC(O)NR^1R^2$, —$S(O)_2R^1$, —$S(O)_2OR^1$, —$S(O)_2O^-$, —$S(O)_2NR^1R^2$, —$NR^1C(O)R^2$, —$NR^1C(O)OR^2$, —$NR^1C(O)SR^2$, —$NRC(O)NR^2R^3$, —$P(O)_2R^1$, —$P(O)(OR^1)_2$, —$P(O)(OR^1)O^-$, and —$P(O)(O^-)_2$; wherein the index n is an integer from 0 to 4, preferably from 0 to 1, most preferably 0; wherein two $R_o$ on different A, B and C rings may combine to form a fused ring of five or more members; when the fused ring is six or more members, two $R_o$ on different A, B and C rings may combine to form an organic linker optionally containing one or more heteroatoms; in one embodiment two $R_o$ on different A, B and C rings combine to form a heteroatom bridge selected from —O— and —S— creating a six member fused ring; an $R_o$ and $R_m$ on the same ring or an $R_m$ and $R_p$ on the same ring may combine to form a fused aliphatic ring or fused aromatic ring either of which may contain heteroatoms; on at least one of the three rings A, B or C, preferably at least two, more preferably at least three, most preferably all four of the $R_o$ and $R_m$ groups are hydrogen, preferably all four $R_o$ and $R_m$ groups on at least two of the rings A, B and C are hydrogen; in some embodiments, all $R_o$ and $R_m$ groups on rings A, B and C are hydrogen; preferably each $R_p$ is independently selected from hydrogen, —$OR^1$ and —$NR^1R^2$; no more than two, preferably no more than one of $R_p$ is hydrogen, preferably none are hydrogen; more preferably at least one, preferably two, most preferably all three $R_p$ are —$NR^1R^2$; in some embodiments, one or even two of the Rings A, B and C may be replaced with an independently selected $C_3$-$C_9$ heteroaryl ring comprising one or two heteroatoms independently selected from O, S and N, optionally substituted with one or more independently selected $R^5$ groups; G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, or phosphine oxide; in one aspect the fraction [(deuterium)/(deuterium+hydrogen)] for G is at least 0.20, preferably at least 0.40, even more preferably at least 0.50 and most preferably at least 0.60 or even at least 0.80; wherein any two of $R^1$, $R^2$ and $R^3$ attached to the same heteroatom can combine to form a ring of five or more members optionally comprising one or more additional heteroatoms selected from the group consisting of —O—, —$NR^{15}$—, and —S—.

In the structure of Formula (II)-(III), e and f are independently integers from 0 to 4; each $R^{20}$ and $R^{21}$ is independently selected from the group consisting of halogens, a nitro group, alkyl groups, substituted alkyl groups, —NC(O)$OR^1$, —NC(O)$SR^1$, —$OR^1$, and —$NR^1R^2$; each $R^{25}$ is independently selected from the group consisting of monosaccharide moiety, disaccharide moiety, oligosaccharide moiety, and polysaccharide moiety, —C(O)$R^1$, —C(O)$OR^1$, —C(O)$NR^1R^2$; each $R^{22}$ and $R^{23}$ is independently selected from the group consisting of hydrogen, alkyl groups, and substituted alkyl groups.

In the structure of Formula (IV), wherein $R^{30}$ is positioned ortho or para to the bridging amine moiety and is selected from the group consisting of —$OR^{38}$ and —$NR^{36}R^{37}$, each $R^{36}$ and $R^{37}$ is independently selected from the group consisting of hydrogen, alkyl groups, substituted alkyl groups, aryl groups, substituted aryl groups, acyl groups, $R^4$, —C(O)$OR^1$, —C(O)$R^1$, and —C(O)$NR^1R^2$; $R^{38}$ is selected from the group consisting of hydrogen, acyl groups, —C(O)$OR^1$, —C(O)$R^1$, and —C(O)$NR^1R^2$; g and h are independently integers from 0 to 4; each $R^{31}$ and $R^{32}$ is independently selected from the group consisting of alkyl groups, substituted alkyl groups, aryl groups, substituted aryl groups, alkaryl, substituted alkaryl, —$(CH_2)_n$—O—$R^1$, —$(CH_2)_n$—$NR^1R^2$, —C(O)$R^1$, —C(O)$OR^1$, —C(O)$O^-$, —C(O)$NR^1R^2$, —OC(O)$R^1$, —OC(O)$OR^1$, —OC(O)$NR^1R^2$, —S(O)$_2R^1$, —S(O)$_2OR^1$, —S(O)$_2O^-$, —S(O)$_2NR^1R^2$, —$NR^1$C(O)$R^2$, —$NR^1$C(O)$OR^2$, —$NR^1$C(O)$SR^2$, —NRC(O)$NR^2R^3$, —P(O)$_2R^1$, —P(O)$(OR^1)_2$, —P(O)$(OR^1)$O—, and —P(O)$(O^-)_2$; wherein the index n is an integer from 0 to 4, preferably from 0 to 1, most preferably 0; —$NR^{34}R^{35}$ is positioned ortho or para to the bridging amine moiety and $R^{34}$ and $R^{35}$ are independently selected from the group consisting of hydrogen, alkyl, substituted alkyl, aryl, substituted aryl, alkaryl, substituted alkaryl, and $R^4$; $R^{33}$ is independently selected from the group consisting of hydrogen, —S(O)$_2R^1$, —C(O)N(H)$R^1$; —C(O)$OR^1$; and —C(O)$R^1$; when g is 2 to 4, any two adjacent $R^{31}$ groups may combine to form a fused ring of five or more members wherein no more than two of the atoms in the fused ring may be nitrogen atoms.

In the structure of Formula (V), wherein $X^{40}$ is selected from the group consisting of an oxygen atom, a sulfur atom, and $NR^{45}$; $R^{45}$ is independently selected from the group consisting of hydrogen, deuterium, alkyl, substituted alkyl, aryl, substituted aryl, alkaryl, substituted alkaryl, —S(O)$_2$OH, —S(O)$_2O^-$, —C(O)$OR^1$, —C(O)$R^1$, and —C(O)$NR^1R^2$; $R^{40}$ and $R^{41}$ are independently selected from the group consisting of —$(CH_2)_n$—O—$R^1$, —$(CH_2)_n$—$NR^1R^2$, wherein the index n is an integer from 0 to 4, preferably from 0 to 1, most preferably 0; j and k are independently integers from 0 to 3; $R^{42}$ and $R^{43}$ are independently selected from the group consisting of alkyl, substituted alkyl, aryl, substituted aryl, alkaryl, substituted alkaryl, —S(O)$_2R^1$, —C(O)$NR^1R^2$, —NC(O)$OR^1$, —NC(O)$SR^1$, —C(O)$OR^1$, —C(O)$R^1$, —$(CH_2)_n$—O—$R^1$, —$(CH_2)_n$—$NR^1R^2$; wherein the index n is an integer from 0 to 4, preferably from 0 to 1, most preferably 0; $R^{44}$ is —C(O)$R^1$, —C(O)$NR^1R^2$, and —C(O)$OR^1$.

In the structures of Formula (I)-(V), wherein any charge present in any of the preceding groups is balanced with a suitable independently selected internal or external counterion. Suitable independently selected external counterions may be cationic or anionic. Examples of suitable cations include but are not limited to one or more metals preferably selected from Group I and Group II, the most preferred of these being Na, K, Mg, and Ca, or an organic cation such as iminium, ammonium, and phosphonium. Examples of suitable anions include but are not limited to: fluoride, chloride, bromide, iodide, perchlorate, hydrogen sulfate, sulfate, aminosulfate, nitrate, dihydrogen phosphate, hydrogen phosphate, phosphate, bicarbonate, carbonate, methosulfate, ethosulfate, cyanate, thiocyanate, tetrachlorozincate, borate, tetrafluoroborate, acetate, chloroacetate, cyanoacetate, hydroxyacetate, aminoacetate, methylaminoacetate, di- and tri-chloroacetate, 2-chloro-propionate, 2-hydroxypropionate, glycolate, thioglycolate, thioacetate, phenoxyacetate, trimethylacetate, valerate, palmitate, acrylate, oxalate, malonate, crotonate, succinate, citrate, methylene-bis-thioglycolate, ethylene-bis-iminoacetate, nitrilotriacetate, fumarate, maleate, benzoate, methylbenzoate, chlorobenzoate, dichlorobenzoate, hydroxybenzoate, aminobenzoate, phthalate, terephthalate, indolylacetate, chlorobenzenesulfonate, benzenesulfonate, toluenesulfonate, biphenyl-sulfonate and chlorotoluenesulfonate. Those of ordinary skill in the art are well aware of different counterions which can be used in place of those listed above.

In the structures of Formula (I)-(V), $R^1$, $R^2$, $R^3$, and $R^{15}$ are independently selected from the group consisting of hydrogen, alkyl, substituted alkyl, aryl, substituted aryl, alkaryl, substituted alkaryl, and $R^4$; wherein $R^4$ is a organic group composed of one or more organic monomers with said monomer molecular weights ranging from 28 to 500, preferably 43 to 350, even more preferably 43 to 250, wherein the organic group may be substituted with one or more additional leuco colorant moieties conforming to the structure of Formula I-V. In one aspect, $R^4$ is selected from the group consisting of alkyleneoxy (polyether), oxoalkyleneoxy (polyesters), oxoalkyleneamine (polyamides), epichlorohydrin, quaternized epichlorohydrin, alkyleneamine, hydroxyalkylene, acyloxyalkylene, carboxyalkylene, carboalkoxyalkylene, and sugar. In one aspect, $R^4$ is selected from EO, PO, BO, and mixtures thereof, more preferably from EO alone or from EO/PO mixtures. Where any leuco colorant comprises an $R^4$ group with three or more contiguous monomers, that leuco colorant is defined herein as a "polymeric leuco colorant". One skilled in the art knows that the properties of a compound with regard to any of a number of characteristic attributes such as solubility, partitioning, deposition, removal, staining, etc., are related to the placement, identity and number of such contiguous monomers incorporated therein. The skilled artisan can therefore adjust the placement, identity and number of such contiguous monomers to alter any particular attribute in a more or less predictable fashion.

In one aspect, preferred leuco colorants are those giving a second colored state that is resistant to photofading, sometimes referred to as photo-resistant leuco colorants. In instances where the detergent composition is exposed to sunlight, such as may occur if the detergent composition is packaged in a transparent or translucent container, a second colored state of the leuco colorant that resists photofading provides a more accurate indication of the functional age of the product than one that resists photofading less well. In most instances the selection of a photo-resistant leuco colorant is not necessary because the detergent composition is shielded from exposure to sunlight by the packaging, which is frequently opaque.

Preferred leuco colorants include those conforming to the structure of Formula VI,

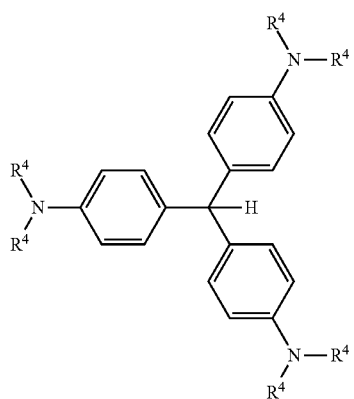

(VI)

wherein each $R^4$ is independently selected from the group consisting of H, Methyl, Ethyl, $((CH_2CH_2O)_a(C_3H_6O)_b)H$, and mixtures thereof; preferably at least one $R^4$ group is $((CH_2CH_2O)_a(C_3H_6O)_b)H$; wherein each index a is independently an integer from 1-100, each index b is independently an integer from 0-50, and wherein the sum of all the independently selected a integers in all $R^4$ groups is no more than 200, preferably no more than 100, and the sum of all the independently selected b integers in all $R^4$ groups is no more than 100, preferably no more than 50. Preferably at least two $R^4$ groups are selected from Methyl and Ethyl, most preferably at least one N in structure VI is substituted with two $R^4$ groups selected from Methyl and Ethyl, preferably Me.

Highly preferred leuco colorants include those conforming to the structure of Formula VII,

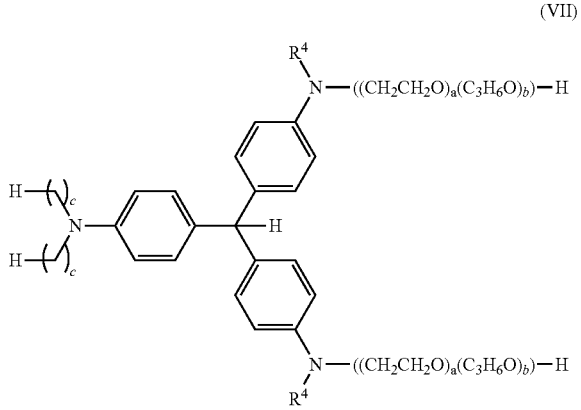

(VII)

wherein each index c is independently 0, 1 or 2, preferably each c is 1; each $R^4$ is independently selected from the group consisting of H, Me, Et, $((CH_2CH_2O)_a(C_3H_6O)_b)H$, and mixtures thereof; preferably each $R^4$ is $((CH_2CH_2O)_a(C_3H_6O)_b)H$ wherein each index a is independently an integer from 1-50, more preferably 1-25, even more preferably 1-20, 1-15, 1-10, 1-5 or even 1-2; each index b is independently an integer from 0-25, more preferably 0-15, even more preferably 1-5 or even 1-3 and wherein the sum of all the independently selected a integers in the leuco colorant is no more than 100, more preferably no more than 80, most preferably no more than 60, 40, 20, 10 or even no more than 5, and the sum of all the independently selected b integers in the leuco colorant is no more than 50, more preferably no more than 40, most preferably no more than 30, 20, or even 10. In a particularly preferred aspect, each index c is 1, each $R^4$ is $((CH_2CH_2O)_a(C_3H_6O)_b)H$, each index a is an integer from 1-5, each index b is an integer from 1-5, the sum of all the independently selected a integers in the leuco compound is from 4 to 10, and the sum of all the independently selected b integers in the leuco colorant is from 5 to 15.

In another aspect, highly preferred leuco compounds include those conforming to the structure of Formula (VIII),

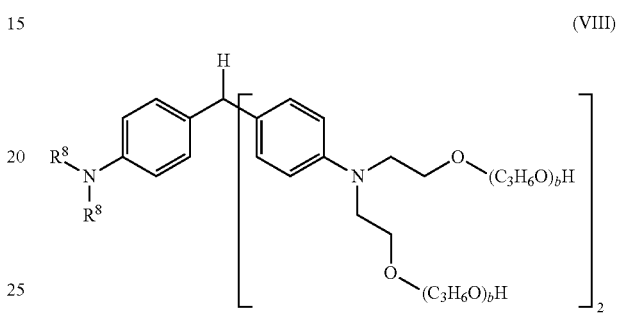

(VIII)

wherein $R^8$ is H or $CH_3$ and each index b is independently on average about 1 to 2.

The leuco triarylmethane compounds described herein can be produced by any suitable synthetic method. For example, such compounds can be produced via an acid catalyzed condensation reaction between an aromatic aldehyde and an electron-rich aryl coupler (e.g., in an amount of approximately 2 molar equivalents of aryl coupler to 1 molar equivalent of aromatic aldehyde). The aromatic aldehyde can be any suitable compound comprising an aromatic moiety (e.g., an aryl moiety, a substituted aryl moiety, a heteroaromatic moiety, or a substituted heteroaromatic moiety) having an aldehyde group covalently attached thereto. In one aspect, the aromatic aldehyde preferably is a substituted benzaldehyde comprising, preferably in the para position relative to the aldehyde group, a group having the structure $-OR^1$ or $-NR^1R^2$. In another aspect, the aromatic aldehyde preferably is a substituted benzaldeyde comprising the group $-NR^1R^2$ in the para position relative to the aldehyde group, wherein $R^1$ and $R^2$ are selected from the group consisting of hydrogen, methyl, or ethyl (more preferably methyl).

As noted above, the condensation reaction utilizes an aryl coupler in addition to the aromatic aldehyde. To produce the leuco triarylmethane compound, the condensation reaction generally utilizes at least two molar equivalents of aryl coupler for each molar equivalent of aromatic aldehyde. In one aspect, the two molar equivalents of aryl coupler utilized in the reaction can be provided using a single aryl coupler compound. In another aspect, the reaction can be performed using two molar equivalents of a mixture of two or more distinct aryl couplers. In such an embodiment, the two or more distinct aryl couplers can be used in any combination or relative ratios provided the mixture sums to at least about two molar equivalents of aryl couplers for each molar equivalent of aromatic aldehyde. In such an embodiment, the two or more distinct aryl couplers can differ in terms of, for example, the number and/or nature of the substituents attached to the aryl moiety. In one aspect, the reaction can utilize a first aryl coupler comprising a first oxyalkylene or polyoxyalkylene moiety having a first distribution of oxyalkylene groups and a second aryl coupler comprising a second oxyalkylene or polyoxyalkylene moiety having a second distribution of oxyalkylene groups that is different from the first distribution. For example, in one aspect, the first aryl coupler can comprise an oxyalkylene moiety consisting of ethylene oxide groups, such as AC-I below, and the second aryl coupler can comprise a polyoxyalkylene moiety consisting of ethylene oxide groups and propylene oxide groups, such as AC-II below.

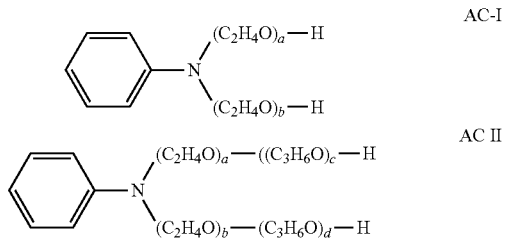

wherein the indices a, b, c and d are independently selected from integers from 0 to 5; the sum of a and b for a coupler selected from AC-I and AC-II is from 2 to 10, and the sum of c and d in AC-II is from 2 to 10. In a more particular aspect, the sum of a and b for a coupler selected from AC-I and AC-II is from 2 to 5, and the sum of c and d in AC-II is from 2 to 5. In one embodiment, the sum of the indices a and b in AC-I is 2 or 3; the sum of the indices a and b in AC-II is 2 or 3 and the sum of the indices c and d in AC-II is 1 to 5, preferably 2 to 4 or even 2 to 3. The couplers AC-I and AC-II may be combined in any proportion provided the amount of the couplers used is sufficient to provide at least two molar equivalents relative to the equivalents of the aromatic aldehyde used in the acid-catalyzed condensation reaction that gives rise to the leuco compound.

In one aspect, for example, one equivalent of para-N,N-dimethylbenzaldehyde is condensed with a mixture of at least two molar equivalents of the aryl couplers AC-I and AC-II shown above wherein for aryl coupler AC-I, the indices a and b sum to 2 or 3, preferably 2, and wherein preferably a and b are each 1; and wherein for aryl coupler AC-II, the indices a and b sum to 2 or 3, preferably 2, and wherein preferably a and b are each 1, and the indices c and d sum to an average of about 2.5 to 3.0, and wherein at least one of c or d is 1.

The detergent composition of the present disclosure comprises water-soluble film which comprises the leuco colorant, meaning that the leuco colorant may be an integral part of the film and/or in contact with an exterior surface of the film. The leuco colorant may be added to the film-forming polymeric material prior to forming the film, for example prior to extruding or casting the film. The leuco colorant may be on an exterior surface of the water-soluble film, where an interior surface is in contact with the first composition. The leuco colorant may be applied to the exterior surface of the film by any suitable means. For example, the leuco colorant may be applied to the exterior of the film by dusting, powdering, coating, painting, printing, spraying, atomizing, or mixtures thereof. In some aspects, the leuco colorant is applied to the unit dose composition by spraying or atomizing a composition comprising the leuco colorant and a plasticizing solvent, which is described below. When the leuco colorant is sprayed or atomized onto a film, the sprayed or atomized composition may be non-aqueous, meaning that it comprises less than 20%, or less than 15%, or less than 10%, or less than 5%, or less than 1% water by weight of the sprayed or atomized composition. The sprayed or atomized composition may even comprise zero percent water.

The detergent composition may comprise a coating, where the coating comprises the leuco colorant.

In some aspects, the concentration of the leuco colorant on the surface of the film is from about 10 ppb to about 10,000 ppm, or preferably from about 50 ppb to about 200 ppm, or more preferably from about 10 ppm to about 250 ppm. In some aspects, the concentration of the leuco colorant is determined after storage of the unit dose article for one month at 25° C. and 60% relative humidity.

In one preferred embodiment, the leuco colorant is encapsulated separately or isolated from other components in the water-soluble film, for example, via capsules or microcapsules. It will be understood that when present in a capsules or microcapsule, the leuco colorants second color state can be blocked or otherwise distorted.

Detergent Adjuncts

The detergent composition may comprise other suitable adjuncts which, in some aspects, can be wholly or partially incorporated into the film. Adjuncts may be selected according to the detergent composition's intended function. The first composition may comprise an adjunct. In some aspects, in the case of multi-compartment unit dose articles, the adjuncts may be part of a non-first (e.g., second, third, fourth, etc.) composition encapsulated in compartments separate from the first composition. The non-first composition may be any suitable composition. The non-first composition may be in the form of a solid, a liquid, a dispersion, a gel, a paste or a mixture thereof. Where the unit dose comprises multiple compartments, the leuco colorant may be added to or present in one, two, or even all the compartments.

Non-limiting examples of detergent compositions include cleaning compositions, fabric care compositions and hard surface cleaners. More particularly, the compositions may be a laundry, fabric care or dish washing composition including, pre-treatment or soaking compositions and other rinse additive compositions. The composition may be a fabric detergent composition or an automatic dish washing composition. The fabric detergent composition may be used during the main wash process or could be used as pre-treatment or soaking compositions.

Fabric care compositions include fabric detergents, fabric softeners, 2-in-1 detergent and softening, pre-treatment compositions and the like. Fabric care compositions may comprise typical fabric care adjuncts, including surfactants, builders, chelating agents, dye transfer inhibiting agents, dispersants, enzymes, and enzyme stabilizers, plasticizing solvents, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments and mixtures thereof. The composition may be a laundry detergent composition comprising an adjunct selected from the group comprising a surfactant, polymers, perfumes, encapsulated perfume materials, structurant and mixtures thereof.

The composition may be an automatic dish washing composition comprising an adjunct selected from surfactant, builder, sulfonated/carboxylated polymer, silicone suds suppressor, silicate, metal and/or glass care agent, enzyme, bleach, bleach activator, bleach catalyst, source of alkalinity, perfume, dye, solvent, filler and mixtures thereof.

Preferably, the liquid composition comprises a surfactant. Surfactants can be selected from anionic, cationic, zwitterionic, non-ionic, amphoteric or mixtures thereof. Preferably, the unit dose composition comprises anionic surfactant, non-ionic surfactant, or mixtures thereof. The detergent composition, preferably the liquid composition, may comprise from about 1% to about 70%, or from about 3% to about 50%, or from about 5% to about 25%, by weight of a surfactant system.

The anionic surfactant may be selected from linear alkyl benzene sulfonate, alkyl ethoxylate sulphate and combinations thereof.

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

The compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the cleaning composition.

The composition may comprise a brightener. Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein. Suitable chelants include a chelant selected from the group consisting of DTPA (Diethylene triamine pentaacetic acid), HEDP (Hydroxyethane diphosphonic acid), DTPMP (Diethylene triamine penta(methylene phosphonic acid)), ethylenediaminedisuccinic acid (EDDS), 1,2-Dihydroxybenzene-3,5-disulfonic acid disodium salt hydrate, and derivatives of such chelants.

The composition may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1, 5-dioic acid and salts thereof; 2-phosphonobutane-1,2,4-tricarboxylic acid and salts thereof; and any combination thereof. The compositions of the present disclosure may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

The composition may comprise one or more polymers. Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Other suitable cellulosic polymers may have a degree of substitution (DS) of from 0.01 to 0.99 and a degree of blockiness (DB) such that either DS+DB is of at least 1.00 or $DB+2DS-DS^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose.

Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

Suitable suds suppressors include silicone and/or fatty acid such as stearic acid.

When the detergent composition comprises a liquid composition encapsulated by the water-soluble film, the liquid composition preferably comprises a plasticizing solvent. The liquid composition may comprise from about 10% to about 50%, or from about 15% to about 40%, by weight of the liquid composition, of the plasticizing solvent.

The plasticizing solvent in the present compositions can be a plasticizing solvent containing water, organic solvent, or mixtures thereof. Suitable organic solvents include low molecular weight alcohols and/or low molecular weight glycols, wherein "low molecular weight" in this context means having a molecular weight of less than about 500. Suitable organic solvents preferably include glycerol, 1,2-propanediol, 1,3-propanediol, dipropylene glycol, diethylene glycol, sorbitol, and mixtures thereof. In some aspects, the plasticizing solvent comprises water, glycerol, 1,2-propanediol, 1-3-propanediol, dipropylene glycol, diethylene glycol, sorbitol, or mixtures thereof.

Anti-Oxidant

The composition may optionally contain an anti-oxidant present from about 0.001 to about 2% by weight. Preferably the antioxidant is present at a concentration in the range 0.01 to 0.1% by weight. Mixtures of anti-oxidants may be used and in some embodiments, may be preferred. One or more antioxidants may be incorporated into any part or the entirety of the water-soluble film. In a preferred embodiment, an antioxidant is incorporated into the water-soluble film along with the leuco colorant.

Anti-oxidants are substances as described in Kirk-Othmer (Vol. 3, page 424) and in Ullmann's Encyclopedia (Vol. 3, page 91).

One class of anti-oxidants used in the present invention is alkylated phenols, having the general formula:

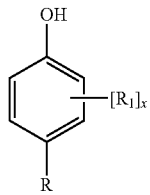

wherein R is $C_1$-$C_{22}$ linear or branched alkyl, preferably methyl or branched $C_3$-$C_6$ alkyl, $C_1$-$C_6$ alkoxy, preferably methoxy, or $CH_2CH_2C(O)OR'$, wherein R' is H, a charge balancing counterion or $C_1$-$C_{22}$ linear or branched alkyl; $R_1$ is a $C_3$-$C_6$ branched alkyl, preferably tert-butyl; x is 1 or 2. Hindered phenolic compounds are a preferred type of alkylated phenols having this formula. A preferred hindered phenolic compound of this type is 3,5-di-tert-butyl-4-hydroxytoluene (BHT).

Furthermore, the anti-oxidant used in the composition may be selected from the group consisting of α-, β-, γ-, δ-tocopherol, ethoxyquin, 2,2,4-trimethyl-1,2-dihydroquinoline, 2,6-di-tert-butyl hydroquinone, tert-butyl hydroxyanisole, lignosulphonic acid and salts thereof, and mixtures thereof. It is noted that ethoxyquin (1,2-dihydro-6-ethoxy-2,2,4-trimethylquinoline) is marketed under the name Raluquin™ by the company Raschig™.

Other types of anti-oxidants that may be used in the composition are 6-hydroxy-2,5,7,8-tetramethylchroman-2-carboxylic acid (Trolox™) and 1,2-benzisothiazoline-3-one (Proxel GXL™).

A further class of anti-oxidants which may be suitable for use in the composition is a benzofuran or benzopyran derivative having the formula:

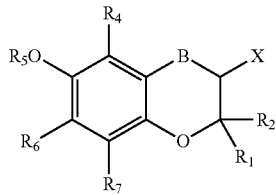

wherein $R_1$ and $R_2$ are each independently alkyl or $R_1$ and $R_2$ can be taken together to form a $C_5$-$C_6$ cyclic hydrocarbyl moiety; B is absent or $CH_2$; $R_4$ is $C_1$-$C_6$ alkyl; $R_5$ is hydrogen or $-C(O)R_3$ wherein $R_3$ is hydrogen or $C_1$-$C_{19}$ alkyl; $R_6$ is $C_1$-$C_6$ alkyl; $R_7$ is hydrogen or $C_1$-$C_6$ alkyl; X is $-CH_2OH$, or $-CH_2A$ wherein A is a nitrogen comprising unit, phenyl, or substituted phenyl. Preferred nitrogen comprising A units include amino, pyrrolidino, piperidino, morpholino, piperazino, and mixtures thereof.

Anti-oxidants such as tocopherol sorbate, butylated hydroxyl benxoic acids and their salts, gallic acid and its alkyl esters, uric acid and its salts, sorbic acid and its salts, and dihydroxyfumaric acid and its salts may also be used. In one aspect, the most preferred types of anti-oxidant for use in the composition are 3,5-di-tert-butyl-4-hydroxytoluene (BHT), α-, β-, γ-, δ-tocopherol, 1,2-benzisothiazoline-3-one (Proxel GXL™) and mixtures thereof. In another aspect, the most preferred types of anti-oxidant for use in the composition are hindered phenols, diarylamines (including phenoxazines with a maximum molar extinction coefficient in the wavelength range from 400 to 750 nm of less than 1,000 $M^{-1}$ $cm^{-1}$), and mixtures thereof. In preferred mixtures, the number of equivalents of hindered phenol initially formulated will normally be greater than or equal to the number of equivalents of diarylamine.

Process for Washing

The present disclosure also relates to a process for the washing, for example by machine, of laundry or dishware using a composition according to the present disclosure, comprising the steps of, placing a detergent composition according to the present disclosure into contact with the laundry or dishware to be washed, and carrying out a washing or cleaning operation.

Any suitable washing machine may be used. Those skilled in the art will recognize suitable machines for the relevant wash operation. The article of the present invention may be used in combination with other compositions, such as fabric additives, fabric softeners, rinse aids, and the like.

Additionally, the detergent compositions of the present disclosure may be used in known hand washing methods.

Process for Making

The present disclosure relates to a method of making a detergent composition. More specifically, the present disclosure relates to a method of making a detergent composition comprising a first composition, a water-soluble film and a leuco colorant, where the method comprises the step of incorporating the leuco colorant into the water-soluble film. The incorporating step may be according to any suitable method of making a detergent composition known to one of ordinary skill, for example by spraying, atomizing, or mixtures thereof said leuco colorant into said film. In such embodiments, the leuco colorant may be added to the film composition prior to casting or extrusion of the film Where the first composition is a granular detergent or a tablet detergent, the method comprises the step of encasing the first composition in either a water-soluble film or a water-soluble coating. Alternatively, the method may comprise the step of providing the first composition already encased in either a water-soluble film or a water-soluble coating.

In some aspects, the present disclosure relates to making a film comprising a leuco colorant, wherein the method comprises the steps of providing a liquid composition comprising a leuco colorant and a plasticizing solvent, and contacting a water-soluble film with the liquid composition, wherein the film comprises a plasticizing agent. The film may be formed into a pouch and sealed, thereby forming a sealed pouch. In some aspects, the sealed pouch encapsulates surfactant. In some aspects, the contacting results from filling the pouch with the liquid composition. In some aspects, the contacting results from spraying or atomizing said liquid composition onto said film. The film may be formed into a pouch after the spraying or atomizing.

The method of making unit dose articles is described in more detail below.

The process of the present disclosure may be continuous or intermittent. The process comprises the general steps of forming an open pouch, preferably by forming a water-soluble film, which may comprise a leuco colorant, into a mould to form said open pouch, filling the open pouch with a composition, closing the open pouch filled with a composition, preferably using a second water-soluble film, which may comprise a leuco colorant, to form the unit dose article. The second film may also comprise additional compartments, which may or may not comprise compositions. Alternatively, the second film may be a second closed pouch containing one or more compartments, used to close the open pouch. Preferably, the process is one in which a web of unit dose article are made, said web is then cut to form individual unit dose articles.

Alternatively, the first film may be formed into an open pouch comprising more than one compartment. In which case, the compartments formed from the first pouch may be in a side-by-side or 'tire and rim' orientation. The second film may also comprise compartments, which may or may not comprise compositions. Alternatively, the second film may be a second closed pouch used to close the multicompartment open pouch.

The unit dose article may be made by thermoforming, vacuum-forming or a combination thereof. Unit dose articles may be sealed using any sealing method known in the art. Suitable sealing methods may include heat sealing, solvent sealing, pressure sealing, ultrasonic sealing, pressure sealing, laser sealing or a combination thereof. Examples of continuous in-line processes of manufacturing water-soluble containers are set forth in U.S. Pat. No. 7,125,828, U.S. 2009/0199877A1, EP 2380965, EP 2380966, U.S. Pat. No. 7,127,874 and US2007/0241022 (all to Procter & Gamble Company, Ohio, USA). Examples of non-continuous in-line processes of manufacturing water-soluble containers are set forth in U.S. Pat. No. 7,797,912 (to Reckitt Benckiser, Berkshire, GB).

The unit dose articles may be dusted with a dusting agent. Dusting agents can include talc, silica, zeolite, carbonate or mixtures thereof.

An exemplary means of making the unit dose article of the present disclosure is a continuous process for making an article, comprising the steps of:

a. continuously feeding a first water-soluble film, which may comprise a leuco colorant, onto a horizontal portion of an continuously and rotatably moving endless surface, which comprises a plurality of moulds, or onto a non-horizontal portion thereof and continuously moving the film to said horizontal portion;
b. forming from the film on the horizontal portion of the continuously moving surface, and in the moulds on the surface, a continuously moving, horizontally positioned web of open pouches;
c. filling the continuously moving, horizontally positioned web of open pouches with a product, to obtain a horizontally positioned web of open, filled pouches;
d. preferably continuously, closing the web of open pouches, to obtain closed pouches, preferably by feeding a second water-soluble film, which may comprise a leuco colorant, onto the horizontally positioned web of open, filed pouches, to obtain closed pouches; and
e. optionally sealing the closed pouches to obtain a web of closed pouches.

The second water-soluble film may comprise at least one open or closed compartment.

In one embodiment, a first web of open pouches is combined with a second web of closed pouches preferably wherein the first and second webs are brought together and sealed together via a suitable means, and preferably wherein the second web is a rotating drum set-up. In such a set-up, pouches are filled at the top of the drum and preferably sealed afterwards with a layer of film, the closed pouches come down to meet the first web of pouches, preferably open pouches, formed preferably on a horizontal forming surface. It has been found especially suitable to place the rotating drum unit above the horizontal forming surface unit.

Preferably, the resultant web of closed pouches is cut to produce individual unit dose articles.

EXAMPLES

Formulation Examples

All levels are in weight percent of the composition.

Example 1—Mono Compartment Pouches

Mono compartment pouches are filled with liquid detergents of composition 1.1, shown in Table 1. The pouches are made using a water-soluble poly(vinyl alcohol) film comprising a leuco colorant (e.g., Leuco colorant 1) and optionally, an antioxidant (e.g., 3,5-di-tert-butyl-4-hydroxytoluene), and formed using standard thermoforming techniques. Specifically, 0.7 g of a 76 μm thick film M8779 and 0.0025 g of Dye Formula 8, shown above, are thermoformed to form a single compartment pouch measuring 41 mm by 43 mm. The pouch is filled with 23.7 mL (25.4 g) of composition 1.1.

TABLE 1

| Ingredients | Composition 1.1 |
| --- | --- |
| Linear $C_9$-$C_{15}$ Alkylbenzene sulfonic acid | 20 |
| $C_{12-14}$ alkyl 9-ethoxylate | 15 |
| Citric Acid | 1 |
| Fatty acid | 8 |
| C12-14 alkyl ethoxy 3 sulfate | 9 |
| Chelant | 1 |
| Polymer | 7 |
| Enzymes | 1 |
| Structurant | 0.15 |
| Glycerol | 6 |
| 1,2 propanediol | 11 |
| Water | 10 |
| Mono-ethanolamine or NaOH (or mixture thereof) | neutralize to pH to about 7.4 |
| Additives, Minor | To 100% |

Example 2—Multi Compartment Pouches

Examples of multicompartment pouches can include the formulations presented in Table 2. The pouches are made with water-soluble film, at least a portion of which is as the film described in Example 1 above.

TABLE 2

|  | 2.1 3 compartments | | | 2.2 2 compartments | | 2.3 3 compartments | | |
|---|---|---|---|---|---|---|---|---|
| Compartment # | 1 | 2 | 3 | 1 | 2 | 1 | 2 | 3 |
| Dosage (g) | 34.0 | 3.5 | 3.5 | 30.0 | 5.0 | 25.0 | 1.5 | 4.0 |
| Ingredients | | | | Weight % | | | | |
| Alkylbenzene sulfonic acid | 20.0 | 20.0 | 20.0 | 10.0 | 20.0 | 20.0 | | |
| Alkyl sulfate | | | | 2.0 | | | | |
| C12-14 alkyl 7-ethoxylate | 17.0 | 17.0 | 17.0 | | 17.0 | 17.0 | | |
| Cationic surfactant | | | | 1.0 | | | | |
| Zeolite A | | | | 10.0 | | | | |
| C12-18 Fatty acid | 13.0 | 13.0 | 13.0 | | 18.0 | 18.0 | | |
| Sodium acetate | | | | 4.0 | | | | |
| Enzymes | 0-3 | 0-3 | 0-3 | 0-3 | | 0-3 | | |
| Sodium Percarbonate | | | | 11.0 | | | | |
| TAED | | | | 4.0 | | | | |
| Organic catalyst [1] | | | | 1.0 | | | | |
| PAP granule [2] | | | | | | | | 50 |
| Polycarboxylate | | | | 1.0 | | | | |
| Ethoxysulfated Hexamethylene Diamine Dimethyl Quat | 2.2 | 2.2 | 2.2 | | | | | |
| Hydroxyethane diphosphonic acid | 0.6 | 0.6 | 0.6 | 0.5 | | | | |
| Ethylene diamine tetra(methylene phosphonic) acid | | | | | 0.4 | | | |
| Brightener | 0.2 | 0.2 | 0.2 | 0.3 | | 0.3 | | |
| Alkoxylated polyamine[6] | 5 | | | 4 | | 7 | | |
| Leuco colorant[4] | | | 0.05 | | 0.035 | | 0.12 | |
| Perfume | 1.7 | 1.7 | | 0.6 | | 1.5 | | |
| Water | 10.0 | 10.0 | 10.0 | 4.0 | | | | |
| Glycerol | 5 | | | | | 6 | 10 | |
| Sorbitol | | | | 1 | | | | |
| Propane diol | 5 | 5 | 5 | 30 | | 11 | | 89 |
| Buffers (sodium carbonate, monoethanolamine) [5] | | | | To pH 8.0 for liquids To RA >5.0 for powders | | | | |
| Minors (antioxidant, aesthetics, . . .), sodium sulfate for powders | | | | To 100% | | | | |

[1] Sulfuric acid mono-[2-(3,4-dihydro-isoquinolin-2-yl)-1-(2-ethyl-hexyloxymethyl)-ethyl] ester as described in U.S. Pat. No. 7,169,744
[2] PAP = Phthaloyl-Amino-Peroxycaproic acid, as a 70% active wet cake
[3] Polyethylenimine (molecular weight = 600) with 20 ethoxylate groups per —NH.
[4] Leuco colorant 1, shown below; At least 10%, preferably at least 50% of the leuco colorant present is incorporated in at least one of the multiple films that comprise the article.
[5] RA = Reserve Alkalinity (g NaOH/dose)
[6] PEI600 EO20, available from BASF

Example 3—Incorporation of a Leuco Colorant into a Film and Changes in Color Upon Aging In order to demonstrate the usefulness of leuco colorants incorporated into a film, three different poly(vinyl alcohol) films were prepared. A 15.51 wt % solution of PVOH in DI water (control, Solution C) was prepared by mixing 110.0 g DI water and 20.2 g PvOH in a glass jar, placing the cap on the jar and heating at 40° C. for two days. Separately, 0.143 g of Leuco Colorant 1 was dissolved in 5.0 mL ethanol, and this was mixed until homogeneous with 117.0 g Solution C to obtain Solution L The structure of the leuco colorant tested is shown below.

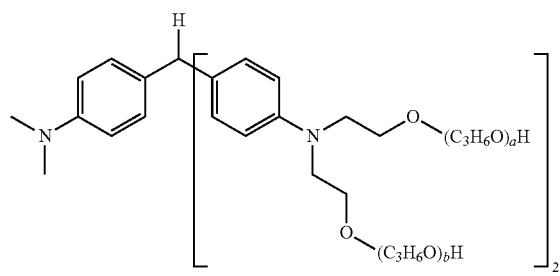

Leuco Colorant 1 (a + b = 2.8; Sum of all a + b = 5.6)

Finally, 0.0422 g of 3,5-di-tert-butyl-4-hydroxy toluene (BHT) was dissolved in 5.0 mL ethanol and this was mixed with 50.0 g Solution L to obtain Solution LA. The final composition of the solutions is provided in the table below.

| | Ingredient Weight % | | |
|---|---|---|---|
| Ingredient | Solution C | Solution L | Solution LA |
| PVOH | 15.51 | 14.87 | 14.10 |
| Leuco Colorant 1[a] | — | 0.117 | 0.106 |
| BHT | — | — | 0.0767 |

For each of the three solutions, 12 films were cast by transferring via disposable syringe 4.0 mL of the solution into each of the wells on two six-well plates. The plates were placed uncovered into an oven set at 30° C. and allowed to stand undisturbed for 65.5 hours. A single piece of film cast from each solution was removed and the L*, a*, b* and WI CIE were measured using a LabScan XE reflectance spectrophotometer (HunterLabs, Reston, Va.; D65 illumination, 10° observer, UV light excluded).

The films were then stored in the dark at room temperature and periodically the film cast from each Solution was removed and measured again to record any changes. As the Leuco Colorant converts from the first colored state to the second colored state, blue color becomes visible. This is observed in the measurements as a change in the b* value, where a lower b* indicates more blue color formation. The b* values measured for the films on various days are gathered in the table below.

| Film cast from Solution | Time (days) | | | | |
|---|---|---|---|---|---|
| | 3 | 12 | 24 | 49 | 327 |
| C | 2.18 | 2.18 | 1.62 | 1.76 | 2.92 |
| L | −7.48 | −12.99 | −21.23 | −29.99 | −59.32 |
| LA | 0.20 | −1.03 | −2.99 | −6.32 | −18.78 |

The above data shows that the incorporation of Leuco Colorant into film leads to a shift in color of the film over time, and that the extent of the color that develops can be changed by the incorporation of an antioxidant into the film. Thus, use of a leuco colorant in a film is an effective way to communicate visually that a product employing the film has aged to a certain extent. If the leuco colorant employed deposits on fabric through the wash, as is known to be the case for the colorant employed in this example, use of the film serves a dual purpose, indicating the age of the product and providing a whiteness benefit to fabrics.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A detergent composition comprising:
    a) a first composition;
    b) a water-soluble film; and
    c) a leuco colorant
    wherein said first composition is selected from the group consisting of a liquid detergent, a granular detergent, or a tablet detergent, and
    wherein at least about 30% of said leuco colorant is incorporated into said water-soluble film.

2. A detergent composition according to claim 1, wherein the leuco colorant is selected from the group consisting of a diarylmethane leuco, a triarylmethane leuco, an oxazine leuco, a thiazine leuco, a hydroquinone leuco, an arylaminophenol leuco and mixtures thereof.

3. A detergent composition according to claim 1, wherein the leuco colorant is selected from one or more compounds selected from the group consisting of:

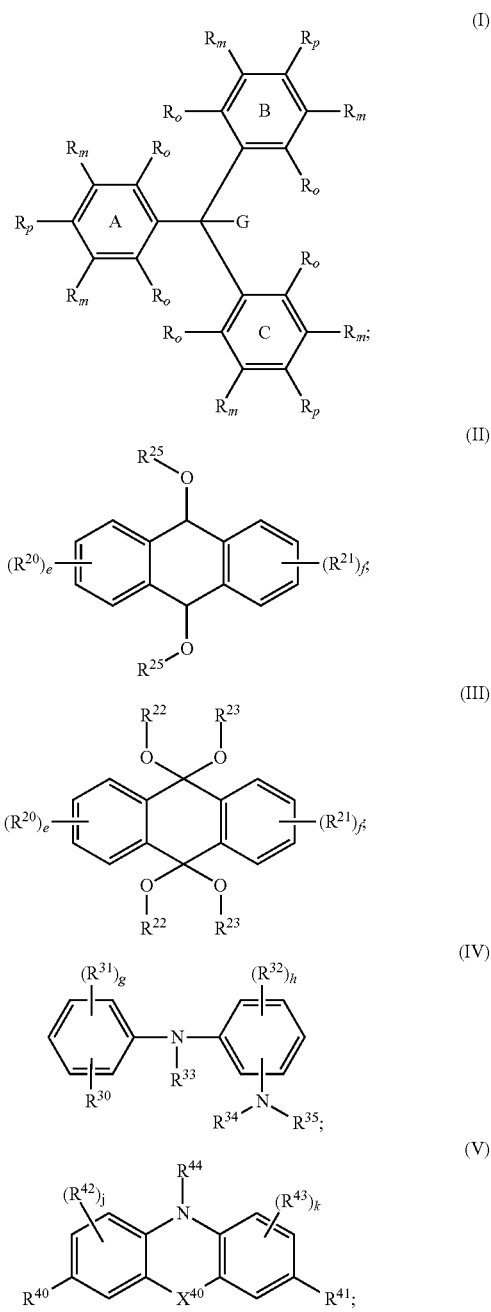

and
    (f) mixtures thereof;
    wherein the ratio of Formula I-V to its oxidized form is at least 1:3; wherein each individual $R_o$, $R_m$ and $R_p$ group on each of rings A, B and C is independently selected from the group consisting of hydrogen, deuterium and $R^5$; wherein each $R^5$ is independently selected from the group consisting of halogens, nitro, alkyl, substituted alkyl, aryl, substituted aryl, alkaryl, substituted alkaryl, —C(O)R¹, —C(O)OR¹, —C(O)O⁻, —C(O)NR¹R²,
—OC(O)R¹, —OC(O)OR¹, —OC(O)NR¹R², —S(O)₂
R¹, —S(O)₂OR¹, —S(O)₂O⁻, —S(O)₂NR¹R²,
—NR¹C(O)R², —NR¹C(O)OR², —NR¹C(O)SR²,
—NR¹C(O)NR²R³, —OR¹, —NR¹R², —P(O)₂R¹,
—P(O)(OR¹)₂, —P(O)(OR¹)O⁻, and —P(O)(O⁻)₂;
wherein at least one of the $R_o$ and $R_m$ groups on at least one of the three rings A, B or C is hydrogen; each $R_p$ is independently selected from hydrogen, —OR¹ and —NR¹R²;
wherein G is independently selected from the group consisting of hydrogen, deuterium, $C_1$-$C_{16}$ alkoxide, phenoxide, bisphenoxide, nitrite, nitrile, alkyl amine, imidazole, arylamine, polyalkylene oxide, halides, alkylsulfide, aryl sulfide, and phosphine oxide;
wherein R¹, R² and R³ are independently selected from the group consisting of hydrogen, alkyl, substituted alkyl, aryl, substituted aryl, alkaryl, substituted alkaryl, and R⁴; R⁴ is a organic group composed of one or more organic monomers with said monomer molecular weights ranging from 28 to 500;
wherein e and f are independently integers from 0 to 4;
wherein each R²⁰ and R²¹ is independently selected from the group consisting of a halogen, a nitro group, alkyl groups, substituted alkyl groups, —NC(O)OR¹, —NC(O)SR¹, —OR¹, and —NR¹R²;
wherein each R²⁵ is independently selected from the group consisting of a monosaccharide moiety, a disaccharide moiety, an oligosaccharide moiety, a polysaccharide moiety, —C(O)R¹, —C(O)OR¹, —C(O)NR¹R²;
wherein each R²² and R²³ is independently selected from the group consisting of hydrogen, an alkyl group, and substituted alkyl groups;
wherein R³⁰ is positioned ortho or para to the bridging amine moiety and is selected from the group consisting of —OR³⁸ and —NR³⁶R³⁷, wherein each R³⁶ and R³⁷ is independently selected from the group consisting of hydrogen, an alkyl group, a substituted alkyl group, an aryl group, a substituted aryl group, an acyl group, R⁴, —C(O)OR¹, —C(O)R¹, and —C(O)NR¹R²;
wherein R³⁸ is selected from the group consisting of hydrogen, an acyl group, —C(O)OR¹, —C(O)R¹, and —C(O)NR¹R²;
wherein g and h are independently integers from 0 to 4;
wherein each R³¹ and R³² is independently selected from the group consisting of an alkyl group, a substituted alkyl group, an aryl group, a substituted aryl group, an alkaryl, substituted alkaryl, —C(O)R¹, —C(O)OR¹, —C(O)O⁻, —C(O)NR¹R², —OC(O)R¹, —OC(O)OR¹, —OC(O)NR¹R², —S(O)₂R¹, —S(O)₂OR¹, —S(O)₂O⁻, —S(O)₂NR¹R², —NR¹C(O)R², —NR¹C(O)OR², —NR¹C(O)SR², —NR¹C(O)NR²R³, —OR¹, —NR¹R², —P(O)₂R¹, —P(O)(OR¹)₂, —P(O)(OR¹)O⁻, and —P(O)(O⁻)₂;
wherein —NR³⁴R³⁵ is positioned ortho or para to the bridging amine moiety and R³⁴ and R³⁵ are independently selected from the group consisting of hydrogen, an alkyl, a substituted alkyl, an aryl, a substituted aryl, an alkaryl, a substituted alkaryl, and R⁴;
wherein R³³ is independently selected from the group consisting of hydrogen, —S(O)₂R¹, —C(O)N(H)R¹; —C(O)OR¹; and —C(O)R¹; wherein when g is 2 to 4, any two adjacent R³¹ groups may combine to form a fused ring of five or more members wherein no more than two of the atoms in the fused ring may be nitrogen atoms;
wherein X⁴⁰ is selected from the group consisting of an oxygen atom, a sulfur atom, and NR⁴⁵; wherein R⁴⁵ is independently selected from the group consisting of hydrogen, deuterium, an alkyl, a substituted alkyl, an aryl, a substituted aryl, an alkaryl, a substituted alkaryl, —S(O)₂OH, —S(O)₂O⁻, —C(O)OR¹, —C(O)R¹, and —C(O)NR¹R²;
wherein R⁴⁰ and R⁴¹ are independently selected from the group consisting of —OR¹ and —NR¹R²;
wherein j and k are independently integers from 0 to 3;
wherein R⁴² and R⁴³ are independently selected from the group consisting of an alkyl, a substituted alkyl, an aryl, a substituted aryl, an alkaryl, a substituted alkaryl, —S(O)₂R¹, —C(O)NR¹R², —NC(O)OR¹, —NC(O)SR¹, —C(O)OR¹, —C(O)R¹, —OR¹, —NR¹R²;
wherein R⁴⁴ is —C(O)R¹, —C(O)NR¹R², and —C(O)OR¹; wherein any charge present in any of the compounds is balanced with a suitable independently selected internal or external counterion.

4. A detergent composition according to claim 3, wherein the leuco colorant conforms to the structure of Formula VI,

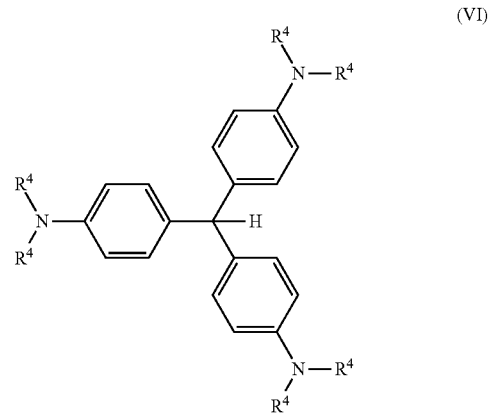

(VI)

wherein each R⁴ is independently selected from the group consisting of H, Methyl, Ethyl, ((CH₂CH₂O)ₐ(C₃H₆O)ᵦ)H, and mixtures thereof, wherein each index a is independently an integer from 1-100 and each index b is independently an integer from 0-50, and wherein the sum of all the independently selected a integers in all R⁴ groups is no more than 200, and the sum of all the independently selected b integers in all R⁴ groups is no more than 100.

5. A detergent composition according to claim 4, wherein the leuco colorant conforms to the structure of Formula VII

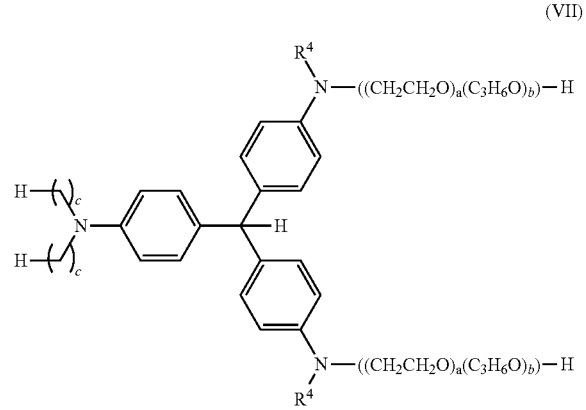

(VII)

wherein each index c is independently 0, 1 or 2; each $R^4$ is independently selected from the group consisting of H, Me, Et, $((CH_2CH_2O)_a(C_3H_6O)_b)H$, and mixtures thereof, wherein each index a is independently an integer from 1-50; each index b is independently an integer from 0-25 and wherein the sum of all the independently selected a integers in the leuco colorant is no more than 100, and the sum of all the independently selected b integers in the leuco colorant is no more than 50.

6. A detergent composition according to claim 5, wherein the leuco colorant conforms to the structure of Formula VIII

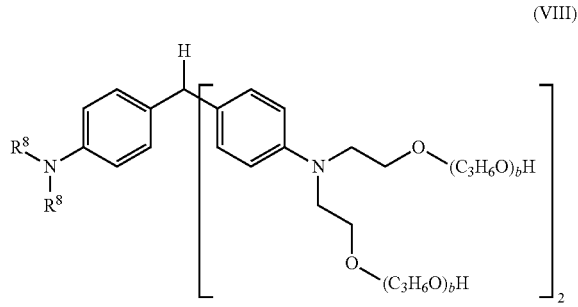

(VIII)

wherein $R^8$ is H or $CH_3$ and each index b is independently on average about 1 to 2.

7. A detergent composition according to claim 1, wherein at least about 50% of the leuco colorant is incorporated into the water-soluble film.

8. A detergent composition according to claim 1, wherein substantially all of the leuco colorant is incorporated into the water-soluble film.

9. A detergent composition according to claim 1, wherein the detergent composition is in the form of a unit dose article.

10. A detergent composition according to claim 9, wherein the unit dose article comprises a first film and a second film.

11. A detergent composition according to claim 10, wherein the leuco colorant is incorporated into the first film.

12. A detergent composition according to claim 10, wherein the leuco colorant is incorporated into both the first film and the second film.

13. A detergent composition according to claim 10, wherein substantially all of the leuco colorant is incorporated into the first film.

14. A detergent composition according to claim 9, wherein the unit dose article comprises a first film, a second film and a common wall.

15. A detergent composition according to claim 14, wherein substantially all of the leuco colorant is incorporated into the common wall.

16. A detergent composition according to claim 1, wherein said first composition comprises an adjunct selected from the group consisting of surfactants, builders, chelating agents, dye transfer inhibiting agents, dispersants, enzymes, enzyme stabilizers, catalytic materials, bleach activators, polymeric dispersing agents, clay soil removal agents, anti-redeposition agents, brighteners, suds suppressors, dyes, perfume, perfume delivery systems, structure elasticizing agents, fabric softeners, carriers, hydrotropes, processing aids, pigments and mixtures thereof.

17. A detergent composition according to claim 1, further comprising an antioxidant incorporated into at least a portion of the water-soluble film, wherein the antioxidant is selected from the group consisting of hindered phenols, diarylamines, and mixtures thereof.

18. A method of determining the approximate functional age of a detergent composition comprising the steps of:
a) providing a detergent composition according to present claim 1;
b) providing a functional age scale comprising a plurality of distinct colors
wherein each distinct color corresponds to a unique functional age; and
c) comparing the color of the detergent composition with the functional age scale.

19. The method of determining the approximate functional age of a detergent composition of claim 18, further comprising providing a package and wherein the functional age scale is provided on the package.

20. A detergent composition according to claim 1, wherein the leuco colorant has a first color state and a second color state and the mole ratio of second color state to first color state is from 2:98 to 25:75.

* * * * *